UNITED STATES PATENT OFFICE.

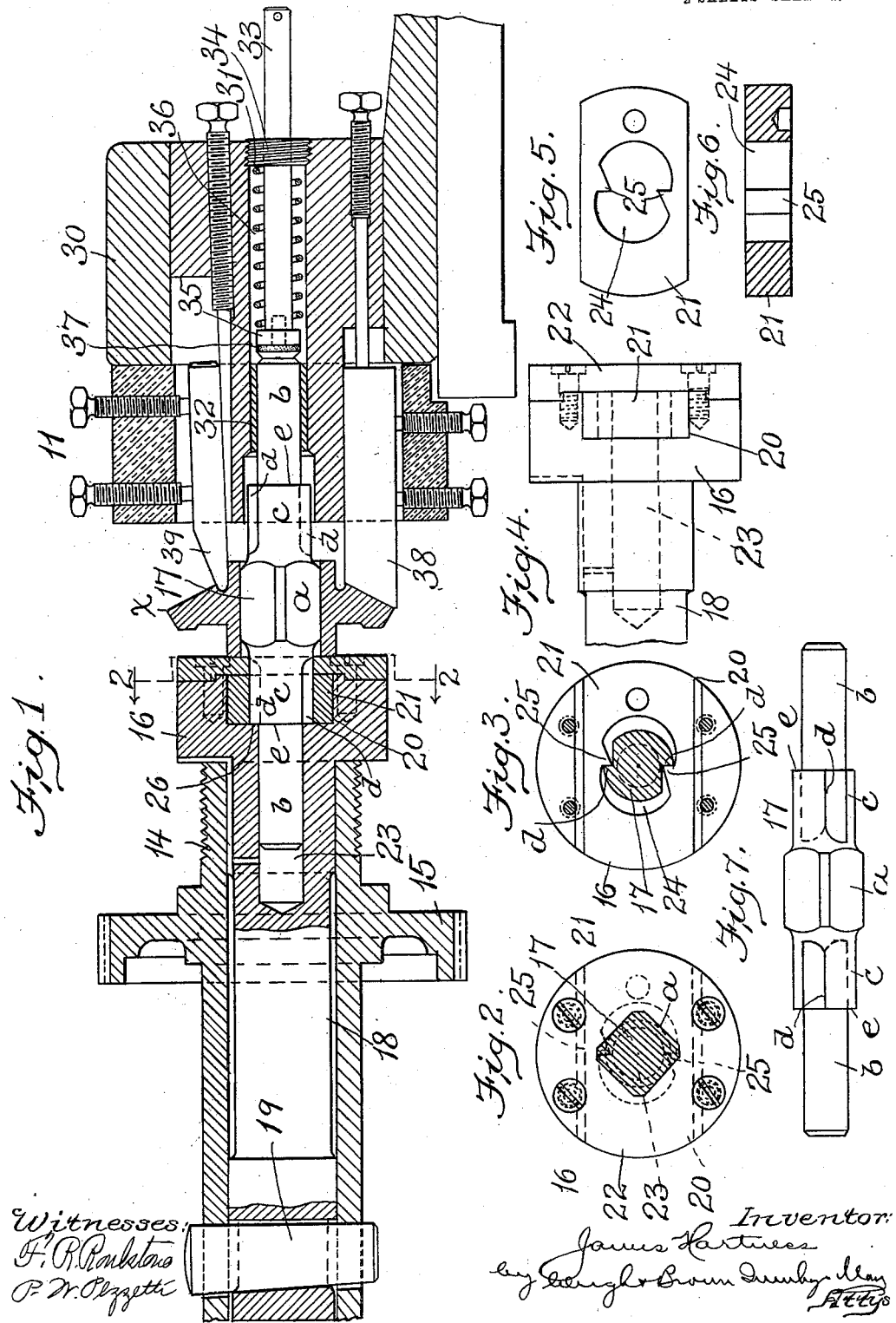

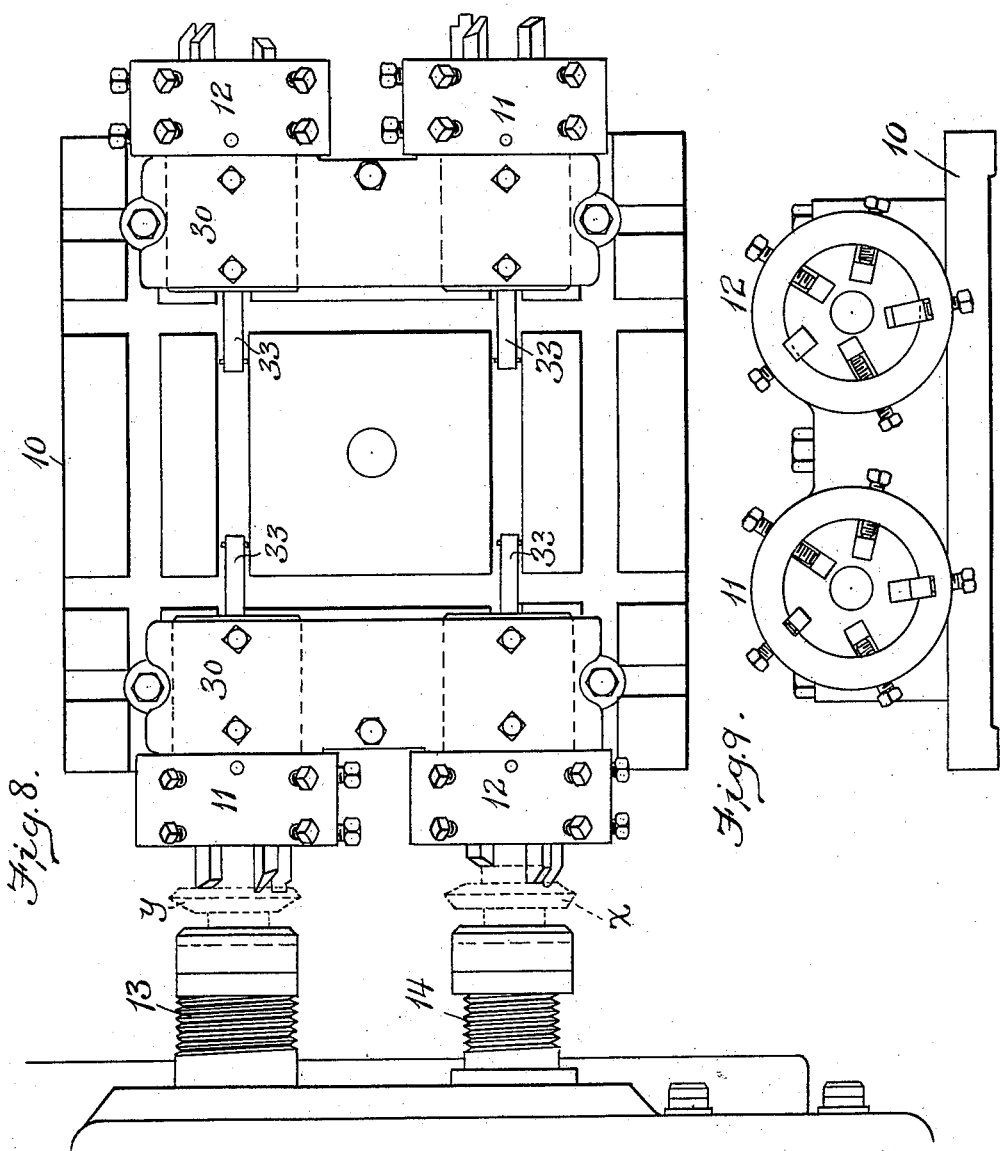

JAMES HARTNESS, OF SPRINGFIELD, VERMONT.

WORK-HOLDER FOR METAL-TURNING MACHINES.

1,036,105.

Specification of Letters Patent.

Patented Aug. 20, 1912.

Application filed September 6, 1911. Serial No. 647,875.

*To all whom it may concern:*

Be it known that I, JAMES HARTNESS, a citizen of the United States, and resident of Springfield, in the county of Windsor and State of Vermont, have invented certain new and useful Improvements in Work-Holders for Metal-Turning Machines, of which the following is a specification.

This invention has relation, broadly speaking, to metal-turning machines, but more particularly to appliances for holding the work, and it has for its object to provide a holder by which the work may be easily reversed end for end to permit both faces to be reduced in succession. In the turning of such metal parts as gears, it is desired to operate on both faces of the work to produce beveled surfaces, shoulders, grooves, and the like. The operation of inserting such a piece of work in the chuck for the operations upon one face and then removing it, reversing it, and replacing it for presenting the other face to the operation of the cutters, consumes considerable time. In accordance with my invention I provide a holder which may be located upon a spindle of a lathe and which will permit the insertion, removal, reversal and reinsertion of the work without loss of time.

Referring to the accompanying drawings: Figure 1 represents a longitudinal section through a spindle and a cutting tool, and shows in section my improved holder. Fig. 2 represents a section on the line 2—2 of Fig. 1. Fig. 3 represents an end elevation of the holder with the face plate removed. Fig. 4 represents a side elevation of the holder. Figs. 5 and 6 represent respectively a face view and a section through the equalizing driving plate. Fig. 7 illustrates the reversible arbor which forms a part of the holder. Fig. 8 represents in plan view a portion of a lathe equipped with the invention, and Fig. 9 represents an end view of the tool carrier.

The same reference characters indicate the same or similar parts wherever they occur.

On the accompanying drawings, first referring to Figs. 8 and 9, a turret is indicated at 10 which is flat and which is also square, looking at it in plan view, so that upon it may be located two tools 11 and 12 to operate simultaneously upon two pieces of work, indicated at $x$ and $y$, rotated by the two spindles 13 and 14. I do not herein claim the square turret nor the double-spindle construction. Each spindle 13 is tubular and is formed with a gear 15 by which it may be rotated. The work-holding means comprises a holder 16 and a reversible arbor 17. The work holder consists of a circular head formed on the end of a shank 18 which is inserted in the end of the spindle and is secured against rotation relatively thereto by a key 19 passed through slots in the spindle and in the shank. It is to be understood, however, that the holder may be secured to the spindle in any other convenient way. The holder is provided in its outer face with a transverse groove or guideway 20 to receive what I call a driving plate 21 which is free to move more or less lengthwise of the guideway. This driving plate is held in place by a face plate 22. It will be noted that the holder has a cylindrical socket 23 concentric with its axis whereas the driving plate has an elliptical socket 24, and it is provided with two ratchet teeth 25, 25, for a purpose to be explained.

The work which is to be faced, if it be a gear, is usually provided with a central rectangular aperture so that it may be fitted on a complementally shaped shaft. Consequently I employ the reversible arbor 17 and form the arbor midway between its ends with a rectangular portion, as indicated at $a$. The two outer ends of the arbor $b$, $b$, are cylindrical and are of the same diameter and length, so that either end is adapted to fit in the socket 23 in the holder. Between the rectangular portion $a$ and the respective ends $b$, $b$, the arbor has intermediate portions $c$, $c$, each of which is provided with two teeth or shoulders $d$, $d$, adapted to engage the teeth 25, 25, in the driving plate. The work is placed upon the angular middle portion of the arbor, as shown in Fig. 1, and one end $b$ of the arbor is passed through the driving plate into the socket 23. Then when the head or holder 16 is rotated, the driving plate will move slightly in one direction or the other to cause its teeth 25 to engage with equal pressure against the shoulders or teeth $d$, $d$, of the arbor.

A tool for operating upon the work is indicated at 11, and it consists of a body 30 having a central aperture or pilot hole 31 into which the outer end of the arbor 17 may project so as to hold the latter against lateral movement. The socket 31 is provided with a bushing 32 to receive the arbor snugly and permit it to rotate therein, the end of the socket being greater in diameter than the portion c of the arbor. Extending into the rear end of the socket 31 is a plunger 33 passed through a cap screw 34 and having on its end a piston 35 which is held against the end of the arbor by a compression spring 36. The engagement of the spring-pressed plunger with the arbor holds the shoulder e of the arbor against a shoulder 26 in the holder. When the cutter is withdrawn the spring 36 forces the plunger forward until the piston thereon, which has a packing 37, passes through the bushing 32 and cleans it, and it also insures that the arbor will remain in position in the holder. Any suitable form of cutters, such as indicated at 38 and 39, may be employed in connection with the tool, but inasmuch as this portion of the tool forms no part of my invention it is unnecessary to describe it further.

In Fig. 8 I have shown two sets of the tools upon the turret and I have shown at $x$ the piece of work illustrated in Fig. 1 in one position in the spindle 14, and at $y$ I have shown the same piece of work held in the spindle 13 but reversed so that its other face is presented to the cutters of the tool 11.

In operation, when the tool slide is withdrawn, the pieces of work, in which the arbors are inserted, are located in the holders so that the outer face of one and the inner face of the other piece of work are presented to the action of the tools. The tool slide is advanced to cause the cutters to operate respectively upon the exposed faces of the two pieces of work. Then the tool slide is reversed and the turret rotated, and each arbor is withdrawn from its spindle with the work thereon, is reversed and is reinserted in the other spindle. Then the tool slide is again advanced and the next set of cutters operate upon the faces of the work which are now exposed. With this operation the cutters 11 and 12 on one side of the turret are arranged the same as those on the other side of the turret.

In practice one tool 11 may have roughing cutters and the other finishing cutters, and the tools 12 may be similarly equipped, so that a piece of work will be subjected to two operations in the spindle 14 before it is reversed and inserted in the spindle 13.

Having thus explained the nature of my said invention, and described a way of constructing and using the same, although without attempting to set forth all the forms in which it may be made or all the modes of its use, what I claim is:

1. A work holder for metal-turning machines, comprising a socketed head adapted for attachment to a lathe spindle, and a reversible arbor having its middle portion shaped to receive the work and its ends shaped to fit the socket in the head.

2. A work holder for metal-turning tools, comprising a socketed head adapted for attachment to a lathe spindle, a reversible arbor having its middle portion shaped to receive the work thereon and its ends shaped to fit the socket in the head, and a driving plate in said head, said plate and arbor having complemental teeth.

3. A work holder for metal-turning tools, comprising a socketed head for attachment to a lathe spindle, said head having a transverse guideway, and a sliding driving plate in said guideway having an aperture with opposing teeth, in combination with an arbor having a portion to receive the work, an end portion to extend into the socket in said head, and an intermediate portion with teeth to engage the teeth on the driving plate.

4. The combination with a socketed driving head and a socketed cutting tool, of a reversible work-holding arbor having ends adapted to enter the sockets in said head and tool.

5. The combination of a socketed driving head having a driving plate, a socketed cutting tool having a spring-pressed plunger extending into its socket, and a reversible work-carrying arbor having similar ends to extend into the sockets in said head and said tool, a middle portion to receive the work and portions between its middle and its ends to engage said driving plate.

6. A work-holding arbor having an angular middle portion to receive the work thereon, similar cylindrical ends, and toothed portions between its middle portion and its ends.

In testimony whereof I have affixed my signature, in presence of two witnesses.

JAMES HARTNESS.

Witnesses:
G. M. CLARE,
J. W. WALKER.